United States Patent [19]

Matui et al.

[11] Patent Number: 5,051,834
[45] Date of Patent: Sep. 24, 1991

[54] PROJECTION-TYPE DISPLAY APPARATUS UTILIZING BOTH ZERO-ORDER AND FIRST-ORDER DIFFRACTED BEAMS

[75] Inventors: Fumio Matui; Yasushi Murata; Satoru Tanaka, all of Saitama, Japan

[73] Assignee: Pioneer Electronic Corporation, Tokyo, Japan

[21] Appl. No.: 497,029

[22] Filed: Mar. 22, 1990

[30] Foreign Application Priority Data

Oct. 4, 1989 [JP] Japan .................. 1-260625

[51] Int. Cl.[5] .......... H04N 5/74; H04N 9/12; H04N 3/10
[52] U.S. Cl. .................. 358/231; 358/201; 358/206
[58] Field of Search .......... 358/231, 60, 63, 199, 358/205, 208, 206; 353/30, 31, 33, 34, 37, 82

[56] References Cited

U.S. PATENT DOCUMENTS

| | | | |
|---|---|---|---|
| 3,597,536 | 8/1971 | Fowler | 358/63 |
| 3,614,312 | 10/1971 | Fournier et al. | 358/231 |
| 3,657,473 | 4/1972 | Corcoran | 358/201 |
| 3,946,433 | 3/1976 | Kermisch | 358/209 |
| 4,001,840 | 1/1977 | Becker et al. | 346/108 |
| 4,084,881 | 4/1978 | Hirabayashi et al. | 358/199 |
| 4,150,396 | 4/1979 | Hareng et al. | 358/63 |
| 4,213,146 | 7/1980 | Maiman | 358/232 |
| 4,611,245 | 4/1986 | Trias | 358/231 |
| 4,833,528 | 5/1989 | Kobayashi | 358/63 |
| 4,946,233 | 8/1990 | Seto | 358/199 |
| 4,969,730 | 11/1990 | van der Brandt | 353/34 |

Primary Examiner—Victor R. Kostak
Assistant Examiner—Jeffrey Murrell
Attorney, Agent, or Firm—Wegner, Cantor, Mueller & Player

[57] ABSTRACT

An apparatus has a light modulator for emitting a first-order diffracted beam to scan a screen two-dimensionally and a zero-order diffracted beam which is two-dimensionally deflected and projected onto the screen. The zero-order diffracted beam is effectively utilized, and the projection-type display apparatus is capable of displaying a new image pattern in which a moving image and a character drawn with a single stroke are displayed in an overlapping manner.

2 Claims, 2 Drawing Sheets

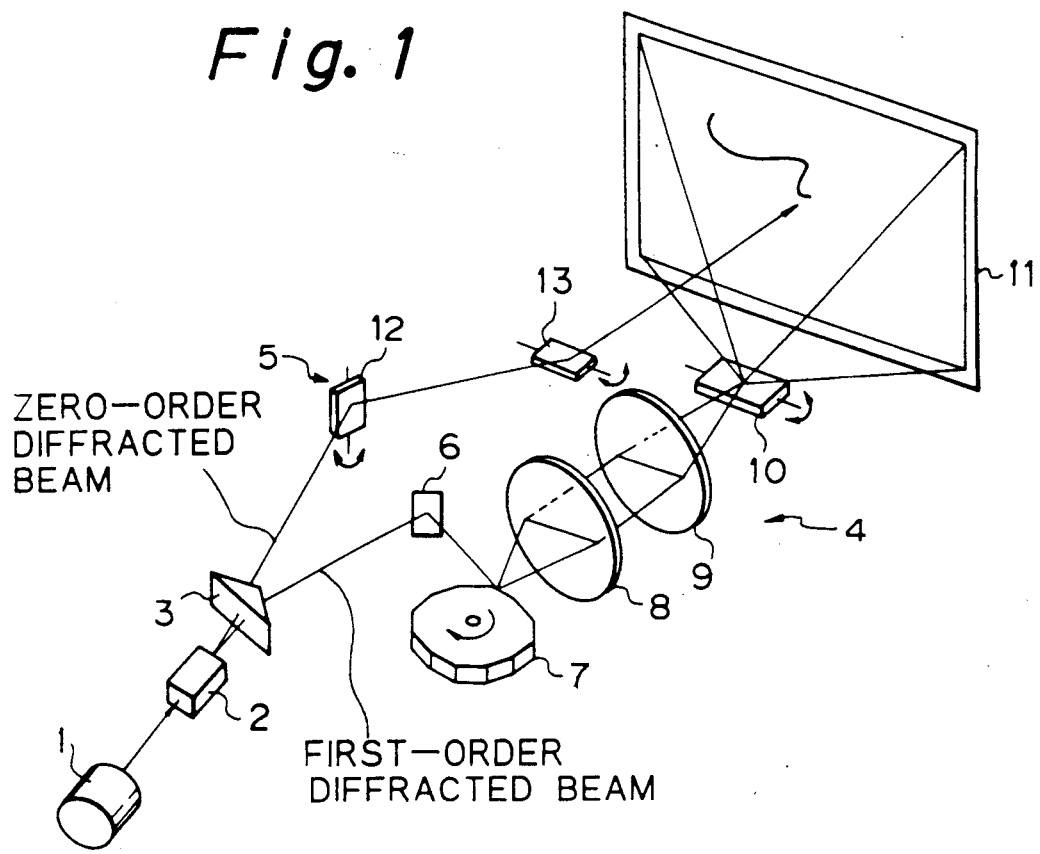
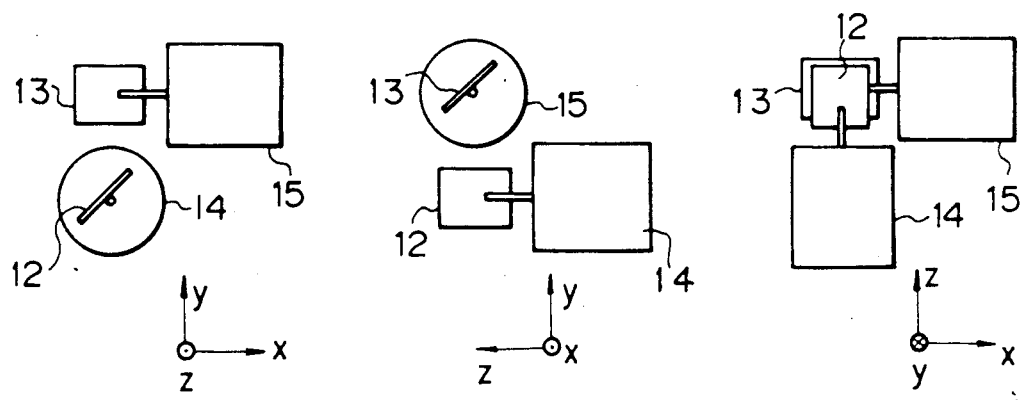

PROJECTION-TYPE DISPLAY APPARATUS UTILIZING BOTH ZERO-ORDER AND FIRST-ORDER DIFFRACTED BEAMS

BACKGROUND OF THE INVENTION

1. Field of the Invention

The present invention relates to a projection-type display apparatus.

2. Description of the Related Art

In one conventional projection-type display apparatus, a laser beam emitted from a laser beam source is modulated in intensity with a modulating signal by a light modulator, and a first-order diffracted beam from the light modulator is introduced as a projecting beam into a light beam scanning system which applies the projecting beam to scan a screen two-dimensionally for thereby projecting an image on the screen. Only the first-order diffracted beam has been employed as the projecting beam, whereas a zero-order diffracted beam which is also emitted from the light modulator has not been utilized.

SUMMARY OF THE INVENTION

It is an object of the present invention to provide a projection-type display apparatus which effectively utilizes a zero-order diffracted beam emitted from a light modulator.

According to the present invention, a projection-type display apparatus includes light modulating means for modulating the intensity of an applied light beam with a modulating signal, scanning means for two-dimensionally scanning a screen with a first-order diffracted beam emitted from the light modulating means, and deflecting means for two-dimensionally deflecting a zero-order diffracted beam emitted from the light modulating means and for projecting the two-dimensionally deflected zero-order diffracted beam onto the screen.

The first-order diffracted beam which is emitted from the light modulating means that modulates the intensity of the applied light beam with the modulating signal is applied to scan the screen two-dimensionally, whereas the zero-order diffracted beam which is also emitted from the light modulating means is two-dimensionally scanned and projected onto the screen.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic perspective view of a projection-type display apparatus according to the present invention;

FIGS. 2A, 2B, and 2C are views showing the relative arrangement of x- and y-axis galvanometer mirrors of a vector scanning system of the projection-type display apparatus.

DETAILED DESCRIPTION OF THE PREFERRED EMBODIMENT

Figure 3:
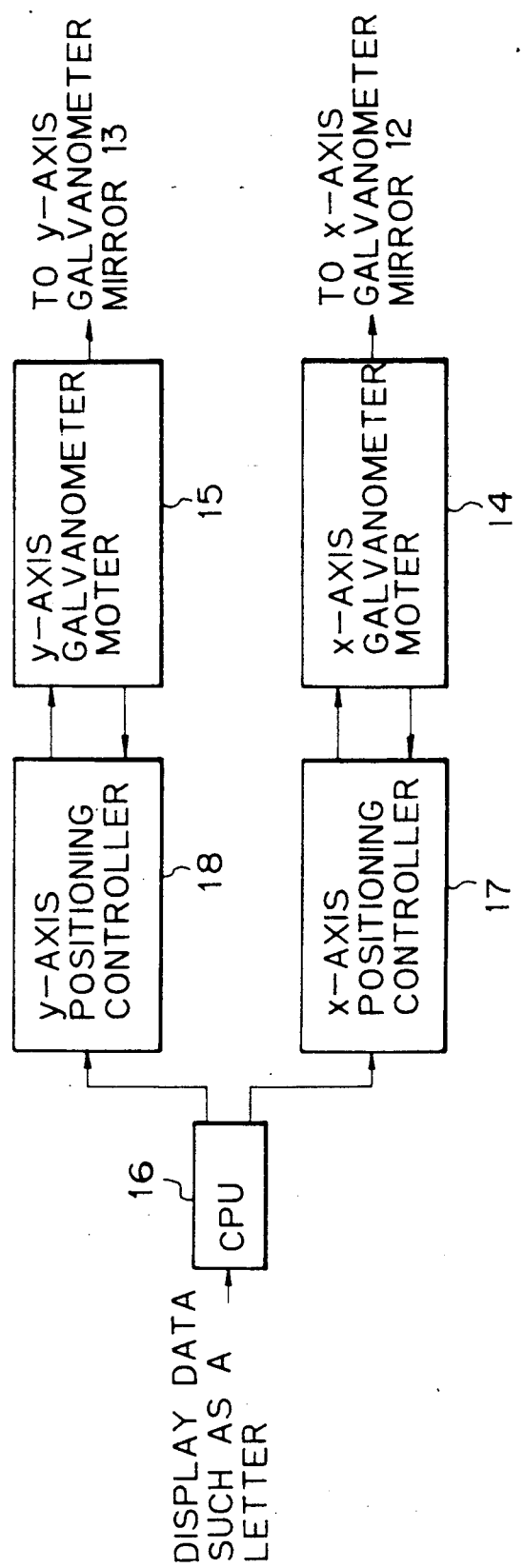
FIG. 3 is a block diagram of a control system for the vector scanning system.

FIG. 1 schematically shows a projection-type display apparatus according to the present invention.

A laser beam emitted from a laser beam source 1 is applied to an acoustooptic (A/O) modulator 2. The A/O modulator 2 modulates the intensity of the applied laser beam with a modulating signal in the form of a time-division color signal composed of three-primary signals generated on the basis of video information of a composite video signal of an applied television signal or the like and representative of the colors of unit pixels, for example. The A/O modulator 2 divides the applied laser beam into a zero-order diffracted beam and a first-order diffracted beam according to Bragg diffraction. The first-order diffracted beam is introduced by a prism 3 into a raster scanning system 4, and the zero-order diffracted beam is introduced also by the prism 3 into a vector scanning system 5 which serves as a deflecting means.

In the raster scanning system 4, the first-order diffracted beam is reflected by a reflecting mirror 6 and applied to a rotating polygon 7. The rotating polygon 7 is rotated in synchronism with a horizontal synchronizing signal of the composite video signal for thereby deflecting the first-order beam in a horizontal scanning direction. The first-order beam deflected by the rotating polygon 7 is applied through a pair of relay lenses 8, 9 to a galvanometer mirror 10. The galvanometer mirror 10 is angularly moved back and forth in synchronism with a vertical synchronizing signal of the composite video signal for thereby deflecting the first-order diffracted beam in a vertical scanning direction. Therefore, the first-order diffracted beam which is projected onto a screen 11 by the raster scanning system 4 is caused by the rotating polygon 7 and the galvanometer mirror 10 to scan the screen 11 in the horizontal and vertical scanning directions. The rotating polygon 7 and the galvanometer mirror 10 are driven by respective actuators which are energized by the horizontal and vertical synchronizing signals, respectively, which are separated from the composite video signal by a synchronizing separator (not shown).

The zero-order beam is two-dimensionally deflected by the vector scanning system 5 and projected onto the screen 11. As shown in FIGS. 2 A through 2 C, the vector scanning system 5 comprises an x-axis (horizontal scanning) galvanometer mirror 12 and a y-axis (vertical scanning) galvanometer mirror 13 which are angularly movable about respective axes that extend perpendicularly to each other, and galvanometer motors 14, 15 for controlling the angles of the galvanometer mirrors 12, 13, respectively. The zero-order diffracted beam which is projected onto the screen 11 by the vector scanning system 5 is controlled by the galvanometer mirrors 12, 13 to move on the screen 11 for drawing an image (typically the profile of a letter or a picture) with a single stroke.

The vector scanning system 5 is controlled by a control system which, as shown in FIG. 3, comprises a CPU 16 for converting display data representing the profile of a letter, a picture, or the like into x and y coordinate data, and outputting the x and y coordinate data as successive positional data indicative of a path to be followed by a projecting light beam in a single stroke, and x- and y-axis positioning controllers 17, 18 which, responsive to control signals representing the positional data from CPU 16, controls the angular positions of the x- and y-axis galvanometer motors 14, 15 while receiving signals indicative of angular positional information of these x- and y-axis galvanometer motors 14, 15.

If the projecting light beam deflected by the vector scanning system 5 is not required to synchronize with the image projected by the raster scanning system 4, then the vector scanning system 5 operates independently of the raster scanning system 4. However, if such synchronization is necessary, then the vector scanning system 5 may be synchronized with the raster scanning system according to a timing signal which is generated from the raster scanning system 4.

With the present invention, as described above, the screen is two-dimensionally scanned with the first-order diffracted beam emitted from the light modulating means, while the zero-order diffracted beam is two-dimensionally deflected and projected onto the screen. Therefore, the zero-order diffracted beam is effectively utilized. In addition, the projection-type display apparatus is capable of displaying a new image pattern in which a moving image and a character drawn with a single stroke are displayed in an overlapping manner.

Although a certain preferred embodiment has been shown and described, it should be understood that many changes and modifications may be made therein without departing from the scope of the appended claims.

What is claimed is:

1. A projection-type display apparatus comprising:
   a screen;
   an acoustooptic modulator for modulating an intensity of a light beam applied thereto with a modulating signal;
   a light source directing said light beam to said acoustooptic modulator;
   scanning means for two-dimensionally scanning said screen with a first-order diffracted beam emitted from said acoustooptic modulator; and
   deflecting means provided separately from said scanning means for two-dimensionally deflecting a zero-order diffracted beam emitted from said acoustooptic modulator independently from said scanning means and for projecting the two-dimensionally deflected zero-order diffracted beam onto said screen.

2. A projection-type display apparatus according to claim 1, wherein said deflecting means comprises two plane mirrors rotatable about respective axes which lie parallel to a display surface of said screen and extend in different directions, and positioning means for angularly positioning said plane mirrors.

* * * * *